3,144,386
MASTITIS AEROSOL FOAM
George E. Brightenback, Plainfield, N.J., assignor to Merck & Co., Inc., Rahway, N.J., a corporation of New Jersey
No Drawing. Filed May 9, 1958, Ser. No. 734,112
2 Claims. (Cl. 167—53)

This invention relates to medicinal preparations, and has for its object the provision of an aerosol foam preparation for discharging medicament contained in a foam into the diseased area. The invention provides an aerosol foam preparation in a container for administering any desired dose or number of doses for the foam under pressure.

The aerosol foam preparation is very effective for the treatment of such diseases or ailments as fistulae, wounds, abrasions, surgical incisions, and is especially advantageous in the treatment of bovine mastitis because of its ease and speed of use, its effective dispersion into the milk system, and the simple means of applying the medication under pressure either in single or repeated doses.

The aerosol foam preparation comprises one or more medicaments, a foam base or carrier usually comprising an oil-water emulsion, including a surfactant, a stabilizer, a thickener and a buffer, and an aerosol propellant, as the important or essential components. These important components, together with any other agents that may be required, in an emulsified state are placed in a pressure tight container, such as the bottles or cans now used for various foam preparations, and are charged with the aerosol propellant under the desired pressure. However, other components may be included to impart properties which give known results in medicinal preparations as will appear hereinafter. As for the component for medication an antibiotic, such as neomycin, penicillin, and streptomycin, sulfonamides, hormones, hydrocortisone, bacteriocidal and bacteriostatic agents, or mixtures of these materials may be used.

The following is an example of a typical formulation which is especially effective in the treatment of bovine mastitis:

*Table I*

| | | |
|---|---|---|
| Duponol WA paste | gm | 36.0 |
| Polyethylene glycol 400 distearate | gm | 4.5 |
| Triton X–100 | gm | 0.5 |
| Sodium sulfate | gm | 0.2 |
| Castile soap | gm | 0.5 |
| Sodium citrate | gm | 2.0 |
| Neomycin sulfate, as base | gm | 5.0 |
| NaOH, 30% solution to pH | | 9.25 |
| Water to make | ml | 100.00 |
| Freon 12 | ml | 10.00 |
| Freon 114 | ml | 10.00 |

In this preparation the Duponol WA paste, polyethylene glycol 400 distearate, Triton X–100, sodium sulfate, castile soap, sodium citrate, sodium hydroxide and water are the active agents which form the foam base or carrier vehicle. The neomycin is the medicament, and the Freon 12 and Freon 114 are the aerosol propellants. The sodium citrate and sodium hydroxide comprise the buffer system to enhance the stability of the system.

A similar preparation was used in the treatment of a cow affected with subacute mastitis of the right hind quarter. The affected quarter was infused with the foam, and the infusion end point was gauged according to the turgidity of the quarter. Immediately after infusion, foam could be pappated in the upper portions of the quarter. Ten hours after the infusion the quarter was milked dry and two observations were made: (1) the quarter seemed less swollen and softer and (2) the secretion appeared to be less viscous and stringy. It is possible that the introduction of a gas into the udder may result in a dilatation of the tubules which in itself enhances the letdown of the secretory plugs associated with mastitis.

A similar aerosol foam preparation but containing 2% gentian violet instead of the neomycin was used in the treatment of another case of bovine mastitis. This preparation was infused into a quarter of an abattoir udder. In two minutes the upper portion of the quarter was incised and the purple-stained foam was evident in the upper extremities of the larger milk ducts. Thirty minutes after infusion of an abattoir udder the milk cisterns of the quarters were still filled with the foamy preparation.

The following is an example of another formulation of the invention:

*Table II*

| | | Per dose | Per can |
|---|---|---|---|
| 1. Procaine penicillin G | gm | 0.100 | 1.000 |
| 2. Procaine hydrochloride | gm | 0.200 | 2.000 |
| 3. Neomyin sulfate | gm | [1] 0.100 | [1] 1.000 |
| 4. Dihydrostreptomycin sulfate | gm | [1] 0.100 | [1] 1.000 |
| 5. Prednisolone phosphate | gm | 0.005 | 0.050 |
| 6. Sodium bisulfite | gm | 0.001 | 0.010 |
| 7. Sodium citrate | gm | 0.200 | 2.000 |
| 8. Stearic acid | gm | 0.500 | 5.000 |
| 9. Cetyl alcohol | gm | 0.100 | 1.000 |
| 10. Mineral oil | gm | 0.200 | 2.000 |
| 11. Petrolatum | gm | 0.500 | 5.000 |
| 12. Propylene glycol | gm | 0.150 | 1.500 |
| 13. Span 60 | gm | 0.100 | 1.000 |
| 14. Tween 60 | gm | 0.050 | 0.500 |
| 15. Triethanolamine | gm | 0.050 | 0.500 |
| 16. Triethanolamine lauryl sulfate | gm | 0.200 | 2.000 |
| 17. Sodium hydroxide 2.5 N to pH | | 7.0 | 7.0 |
| 18. Water to make | gm | 4.500 | 45.000 |
| 19. Freon 114 | gm | 0.250 | 2.500 |
| 20. Freon 12 | gm | 0.250 | 2.500 |
| Total net weight | gm | 5.000 | 50.000 |

[1] Base.

The first five items of the above formulation comprise a mixture of the medicaments procaine penicillin G, procaine hydrochloride, neomycin sulfate, dihydrostreptomycin sulfate and prednisolone phosphate. The items 6 to 18 inclusive comprise the foam base or carrier vehicle. The mineral oil and petrolatum comprise the oil-phase of the oil-water emulsion. The stearic acid and triethanolamine react to form a soap as part of the foam produced when the pressure is released. The triethanolamine lauryl sulfate is used as an additional foaming agent and wetting agent. The cetyl alcohol is used as a thickening agent for aiding in controlling the viscosity of the emulsion. The propylene glycol is used primarily as a humectant in the aqueous phase of the emulsion. The Tween 60 and Span 60 are used as surfactants and emulsifiers in the formation of the oil water emulsion. The water is the major portion of the emulsion. The Freon 12 and Freon 114 are, as in the above formulation, the propellants. 50 grams of this preparation will produce about 500 ml. of foam.

The following procedure is an effective method of producing the last formulation: Heat the stearic acid, cetyl alcohol, petrolatum, Span 60, and Tween 60 in a suitable container to about 85° C. Heat 20% of the water, triethanolamine lauryl sulfate, and propylene glycol to about 85° C. Add the triethanolamine to the resulting aqueous solution and mix well. Add the aqueous solution which is an aqueous vehicle to the first-mentioned mixture which is an oil vehicle at a temperature of about 85° C. while stirring. Continue the stirring until a stable cream is obtained and the product has cooled to about 45° C. Suspend the procaine penicillin G in a solution of procaine hydrochloride, neomycin sulfate, dihydrostreptomycin sulfate, prednisolone phosphate, sodium citrate, and sodium bisulfite in 20% of water. Mix the suspension with the cream obtained in step 3. Adjust the pH of the product to pH 7.0 with 2.5 N sodium hydroxide. Adjust the weight of the cream obtained in step 6 to 45 gm. with water. Allow the product to cool to room temperature and pass it through a colloid mill. Charge 45 gm. of the concentrate into the 2 oz. aerosol metal container, flush with Freon 12 to remove the air, and crimp the valve into position. Pressure load the propellants, either singly or as a 50/50 mixture of propellants 12 and 114. Heat the contents of the can to a minimum temperature of 130° F. to check for evidences of container distortion and other defects such as leakage of propellants.

The following is another example of an aersol foam formulation especially suitable for the treatment of bovine mastitis:

*Table III*

|  | Per dose, gm. | Per unit, gm. |
| --- | --- | --- |
| 1. Procaine penicillin G | 0.100 | 1.000 |
| 2. Prednisolone phosphate | 0.005 | 0.050 |
| 3. Sodium bisulfite | 0.001 | 0.010 |
| 4. Dihydrostreptomycin sulfate (as base) | 0.100 | 1.000 |
| 5. Neomycin sulfate (as base) | 0.100 | 1.000 |
| 6. Stearic acid | 0.400 | 4.000 |
| 7. Cetyl alcohol | 0.075 | 0.750 |
| 8. Mineral oil | 0.200 | 2.000 |
| 9. Petrolatum | 0.400 | 4.000 |
| 10. Span 60 | 0.100 | 1.000 |
| 11. Tween 60 | 0.167 | 1.667 |
| 12. Sodium citrate | 0.125 | 1.250 |
| 13. Triethanolamine lauryl sulfate | 0.200 | 2.000 |
| 14. Polyvinylpyrollidone | 0.100 | 1.000 |
| 15. Sequestrene Na₂Ca | 0.025 | 0.250 |
| 16. Sorbit AC | 0.050 | 0.500 |
| 17. Water | 1.981 | 19.808 |
| 18. Triethanolamine | 0.050 | 0.500 |
| 19. Propylene glycol | 0.125 | 1.250 |
| 20. Freon 12/114 (40/60 mixture) | 0.500 | 5.000 |

The ingredients are much as same as in Table II except for three items, (a) polyvinylpyrollidone which is used as a foam stabilizer; (b) Sorbit AC (an arylnaphthalene sulfonate), an auxiliary emulsifier for the oil in water emulsion as well as a thinning agent; and (c) Sequestrene Na$_2$Ca, a sequestering agent to stabilize the active ingredients soluble and/or suspended ingredients in the water or external phase of the emulsion carrier.

The formulation is preferably prepared as follows: items 6 through 11 are heated to 85° C., items 12 through 17 are heated to 85° C. and then item 18 is added. Items 6 through 11 are then added to items 12 through 18 with vigorous and constant stirring until a temperature of 40–43° C. is attained. Items 1 through 5 are then blended in as the dry powders in the order listed. The mixing is continued until the temperature reaches 37° C. at which time item 19 is carefully blended in. The mixture is continued and the material is subdivided into the proper containers, sealed and pressure filled with the proper propellant.

The following is a description of what is understood to be the composition of the compounds represented by the foregoing trade names:

Duponol WA paste is a technical lauryl sodium sulfate detergent.

Polyethylene glycol 400 distearate is a polyethylene glycol fatty acid ester which acts as an emulsifier and thickener.

Triton X–100 is an alkyl aryl polyether alcohol detergent.

Freon 12 is a dichlorodifluoromethane propellant.

Freon 114 is a dichlorotetrafluoroethane propellant.

Span 60 is a sorbitan monostearate emulsifier.

Tween 60 is a sorbitan monostearate polyalkylene derivative emulsifier.

The pH is important. In preparation of Table I, a pH of approximately 9 is necessary for the desired fluidity of the carrier. Above or below this pH, the carrier becomes a gelatinous mass incapable of being forced through the dip tube and valve by the pressures customarily used in foam products. In preparations listed in Tables II and III a pH between 6 and 7 is preferred for the best stability of the antibiotics.

Internal pressures are of importance since they do regulate the amount and consistency of the foam produced. But since there is a close relationship between the pressure and carrier consistency related to the type of foam produced, it is difficult to place limits on internal pressures. However, limits may be established for pressure as related to the type of container used. Metal containers commercially available as listed below are limited to maximum pressures of 70 p.s.i. gauge, and the plastic coated glass bottles are limited to maximum pressures of 40 p.s.i. gauge.

The following is a list of containers that may be used for containing and administering the preparations of the invention.

A. Glass containers:
   The Wheaton Plastic Coated 2½ oz. glass aerosol bottle.
B. Metal containers:
   (1) The White Metal Mfg. Co.'s can made of extruded aluminum with a capacity of 2¾ oz., lacquer lined and necked for a 1" valve (size 1½" x 3½").
   (2) The Peerless Tube Co.'s can made of extruded aluminum with a capacity of 2¼ oz., lacquer lined and necked for a 1" valve (size 1⅜" x 3¹³⁄₁₆").
   (3) American Can Co.'s container, 202 x 214 round domed 0.50 electrolytic tin-plate throughout, side seam soldered outside, top and bottom compound lined and double seamed, sides lacquer lined.

The valves with which the containers are fitted are of special interest. The ideal valve for treating bovine mastitis would be a metering valve capable of delivering 5 grams of material with 3 to 5 activations to insure correct dosage. However, the following valves are suitable for the purposes of this invention.

A. Glass:
   Risdon's glass bottle valve Model 5597GB.
   Precision's glass bottle valve Model 6B or its equivalent for pastic coated bottles.
B. Standard 1" cup valves of metal:
   Clayton Mfg. Co.'s valve for foam products, model depending on use of dip tube.
   V.C.A.'s all stainless steel foam valve.
   Any other foam valve with a standard 1" cup.

The type of actuator for administering the preparation into an udder is one which can best be adapted to take a removable cannula type applicator; such as an open end milking tube having an opening somewhere between 10–13 gauge.

I claim:
1. A method for the treatment of bovine mastitis which comprises infusing into the milk duct system of the udder of an infected host a self-propelling mixture comprising a medicament which is effective against bovine mastitis, a liquid foam composition comprising a foam base including an oil and water emulsion stabilized with a surfactant and an emulsifier, the water being the major portion of the emulsion, and a non-toxic aerosol propellant, said propellant being capable of exerting sufficient pressure to expel said foam and medicament into said milk duct system and into the mucous membranes thereof.

2. The method of claim 1 wherein the medicament is selected from the group consisting of neomycin, penicillin, dihydrostreptomycin, prednisolone and mixtures thereof.

(References on following page)

References Cited in the file of this patent

UNITED STATES PATENTS

| | | |
|---|---|---|
| 2,640,801 | Burkhart | June 2, 1953 |
| 2,655,480 | Spitzer | Oct. 13, 1953 |
| 2,728,704 | Edds | Dec. 27, 1955 |
| 2,879,231 | Allen et al. | Mar. 24, 1959 |
| 2,908,609 | Aterno | Oct. 13, 1959 |
| 2,908,650 | Fine | Oct. 13, 1959 |
| 2,953,284 | Prussin et al. | Sept. 20, 1960 |
| 2,954,935 | Stearns | Oct. 4, 1960 |
| 2,968,592 | Curtis | Jan. 17, 1961 |
| 2,968,628 | Reed | Jan. 17, 1961 |
| 2,995,521 | Estignard-Bluard | Aug. 8, 1961 |

OTHER REFERENCES

"Topicort," Amer. Pfr. and Aromatics, vol. 68, No. 5, November 1956, page 63.

Henderson: Mfg. Chemist, December 1956, pages 505–508.

Di Giacomo: Amer. Pfr. and Aromatics, vol. 69, No. 1, January 1957, pages 72, 74.

Drug Trade News, Jan. 14, 1957, page 20.

Barr: Aerosol Age, September 1957, pages 19–20, 23, 25.

Sagarin: Cosmetics Science and Technology, 1957, pages 794–795 and 828–833.